(12) United States Patent
Pirtle et al.

(10) Patent No.: US 6,384,126 B1
(45) Date of Patent: May 7, 2002

(54) BINDER FORMULATION AND USE THEREOF IN PROCESS FOR FORMING MINERAL PELLETS HAVING BOTH LOW AND HIGH TEMPERATURE STRENGTH

(75) Inventors: James Pirtle, 152 Brookville Rd.Muttontown, Glen Head, NY (US) 11545; John C. Nigro, Bloomington, MN (US)

(73) Assignee: James Pirtle, Glen Head, NY (US)

( * ) Notice: Subject to any disclaimer, the term of this patent is extended or adjusted under 35 U.S.C. 154(b) by 0 days.

(21) Appl. No.: 09/189,056

(22) Filed: Nov. 9, 1998

Related U.S. Application Data

(60) Provisional application No. 60/065,052, filed on Nov. 10, 1997.

(51) Int. Cl.[7] .................................................. C08K 3/36
(52) U.S. Cl. ....................... 524/493; 524/445; 524/447; 524/492
(58) Field of Search ................................ 524/492, 445, 524/447, 493

(56) References Cited

U.S. PATENT DOCUMENTS

| | | | |
|---|---|---|---|
| 2,833,661 A | 5/1958 | Iler ............................. 106/93 |
| 2,884,320 A | 4/1959 | Johnson .......................... 75/3 |
| 2,941,958 A | 6/1960 | Connor ....................... 252/449 |
| 3,287,313 A | 11/1966 | Imoto .......................... 260/41 |
| 3,661,555 A | 5/1972 | Kusama et al. ................. 75/3 |
| 3,725,032 A | 4/1973 | Kihlstedt ........................ 75/3 |
| 3,738,957 A | 6/1973 | Iler ............................ 260/41 |
| 3,773,776 A | 11/1973 | Iler ........................... 260/29.6 |
| 3,860,414 A | 1/1975 | Lang et al. ...................... 75/3 |
| 4,016,129 A | 4/1977 | Miyosawa ................. 260/29.7 |
| 4,518,428 A | * 5/1985 | Ellenbaum et al. ............ 75/257 |
| 4,549,904 A | * 10/1985 | Matsumiya et al. .............. 75/7 |
| 4,621,011 A | * 11/1986 | Fleischer et al. ........... 428/221 |
| 4,767,449 A | 8/1988 | Rosen et al. ..................... 75/3 |
| 4,792,487 A | 12/1988 | Schubring et al. .......... 428/342 |
| 4,863,512 A | * 9/1989 | Banyai et al. .................... 75/5 |
| 4,919,711 A | * 4/1990 | Banyai et al. ................ 75/321 |
| 4,963,185 A | * 10/1990 | Ellenbaum et al. ........... 75/323 |
| 4,985,075 A | 1/1991 | Ohno et al. .................... 75/460 |
| 5,002,607 A | * 3/1991 | Flesher et al. ................. 75/772 |
| 5,118,727 A | * 6/1992 | Roberts et al. ............. 523/216 |
| 5,472,675 A | 12/1995 | Polizzotti ....................... 423/1 |
| 5,698,007 A | * 12/1997 | Schmitt ....................... 75/772 |

OTHER PUBLICATIONS

ELVANOL® , available from Du Pont, Wilmington, Delaware—Material Safety Data Sheet, Apr. 9, 1997.
LUDOX®SK formulations, available from Du Pont, Wilmington, Delaware—Material Safety Data Sheet, Aug. 20, 1992.
AIRVOL® , available from Air Products & Chemicals, Inc.—Material Safety Data Sheet, Nov. 1997.
NYACOL®1440, available from EKA Chemicals, Inc. Marietta, GA—Material Safety Data Sheet, Feb. 1996.
AEROSIL, available from Dugussa Corp., Ridgefield Park, NJ—Material Safety Data Sheet, Mar. 1997.

* cited by examiner

*Primary Examiner*—Judy M. Reddick
(74) *Attorney, Agent, or Firm*—Dara L. Onofrio, Esq.; Onofrio Law

(57) ABSTRACT

A binder formulation comprised of colloidal silica and a polymeric binder, preferably polyvinyl alcohol. A mineral pellet and related low temperature hardening process for making the same. The mineral pellet has sufficient strength to be transported and has sufficient strength for use in iron-making processes.

5 Claims, 3 Drawing Sheets

BINDER FORMULATION AND USE THEREOF IN PROCESS FOR FORMING MINERAL PELLETS HAVING BOTH LOW AND HIGH TEMPERATURE STRENGTH

CROSS-REFERENCE TO RELATED APPLICATIONS

This application claims priority of provisional U.S. patent application No. 60/065,052, filed Nov. 10, 1997. The text of the provisional application is incorporated by reference herein.

FIELD OF THE INVENTION

The present invention relates to binder formulations for use in agglomerating mineral concentrates or fines comprised of colloidal silica and a polymeric binder. More particularly, it is directed to a mineral pellet including the binder formulation and related low temperature hardening process for making the same.

BACKGROUND OF THE INVENTION

Pelletizing is the most desirable agglomerating process for iron ore. The concentrates produced are of an extremely fine size (85%—44 micrometers) and are readily formed into green pellets.

The process encompasses two basic steps: (1) the formation of sized (−½+⅝-inch) green (wet) pellets from a moist filter cake concentrate via the balling process, and (2) the oxidation and induration of the green pellet by high temperature heat treatment in an oxidizing atmosphere to produce a fired pellet with sufficient strength and abrasion resistance to withstand the rigors of handling, transportation, storage and blast furnace reduction/smelting.

Different types of additives, which can be classified as binders, fluxes, and fluxing binders are sometimes used to aid in pellet forming, induration and blast furnace reduction. Bentonite, composed mostly of the clay mineral, montomorillonite, is the binder most commonly used to minimize degradation of the green and dry pellet during the induration process. Recently, several water soluble organic binders have been used, in lieu of bentonite, to reduce silica contamination and improve the reducibility of the fired pellet. These organic binders, which include Carboxy Methyl Cellulose (CMC), Alcotac-Acrylate/Acrylamide copolymer and modified starch, are used to eliminate the additional 0.5% silica that bentonite adds to the pellet and also to improve the 'reducibility' of the fired pellet. A lower 'silica' pellet reduces the slag volume in the blast furnace and a higher 'reducibility' pellet increases blast furnace productivity and lowers the coke rate requirement.

Most of the iron ore concentrates produced in North America contain over 95% magnetite. During the heat treating process the magnetite ($Fe_3O_4$) is oxidized to hematite ($Fe_2O_3$) according to the reaction:

$$4Fe_3O_4 + O_2 \rightarrow 6Fe_2O_3$$

This reaction begins at about 1600° F. and is completed around 2000° F. if sufficient oxygen is available. The reaction is exothermic and releases about 210 Btus per pound of magnetite. The heat generated provides over half the total heat required for the process. The oxide bonding produced by the conversion of the magnetite to hematite, however, is not sufficient to produce a competent pellet and the pellet must be further heated to a temperature of 1288 to 1343° C. (2350–2450° F.) to complete the sintering of the hematite grains and slag bonding of the gangue constituents. The final pellet has a compressive strength of over 500 pounds.

The fuel (natural gas) and electric power requirements for producing pellets from magnetic taconite concentrates is currently about 350,000 Btus and 35 KWH per long ton pellets, respectively. The pelletizing process for hematite concentrate is similar to that for magnetite but because there is no exothermic heat release the total fuel requirements are considerably higher.

The mechanical specifications for good shipping 'fired' pellets consist of the following:

(1) Size structure—Pellets should be closely sized, preferably in the −½+⅜-inch size range with less than 2% finer than ¼-inch.

(2) Weatherability—Pellets must have excellent resistance to long term stock piling and outdoor winter storage. Maximum moisture content should not exceed 3 percent and freezing must not be a problem.

(3) Resistance to Breakage during Handling and Shipping—Pellets must be strong enough to withstand (without substantial breakage) normal handling between the pellet plant (mine site) and the blast furnace. Two standard ASTM tests are available to predict the pellet strength performance. They are the tumble test and the pellet compressive test.

In the tumble test, a 25 pound sample of plus ¼-inch pellets are tumbled in a 3-foot diameter by 18-inch wide steel drum (fitted with lifters) for 200 revolutions at a speed of 24 RPM. After tumbling, the pellets are screened at ¼-inch and 28 mesh. The weight percent plus ¼-inch is referred to as the 'tumble index' and the percentage of minus 28-mesh fines produced as the 'abrasion (dust) index'. Fired pellets normally have a tumble index greater than 95 percent and an abrasion index of less than 3.5 percent.

In the compressive test, the compressive strength of 60 individual pellets is determined at room temperature with an automatic compressive tester using a constant speed load. The average compressive strength of the −½+⅜-inch pellets should exceed 450 pounds. The percentage of pellets that have a compressive strength of less than 200 pounds is also important since most of the weaker pellets tend to break up during handling, transportation and blast furnace reduction.

Iron ore pellets containing 4–5% silica are used in North America, primarily as a feed stock for blast furnace reduction and smelting. The blast furnace is a counter current furnace which has the ability to reduce and melt burdens and use coke as the source of heat and reducing gases.

In the upper part of the shaft, sometimes referred to as the Massive Zone, the hematite pellets are slowly heated and reduced while descending. Beginning at a temperature of about 450–500° C. the hematite in the pellet is reduced to magnetite according to the reaction:

$$3Fe_2O_3 \text{ (hematite)} + CO \rightarrow 2Fe_3O_4 \text{ (magnetite)} + CO_2$$

The reduction of hematite-to-magnetite results in a change in crystal structure that sets up stresses in the pellet that are strong enough to cause significant pellet degradation. The fine particles produced can be either carried out of the furnace in the gas stream or fill the interstices of the burden and reduce its permeability. The performance of pellets in this section of the furnace can be predicted with the standard low temperature breakage (LTB) test.

At intermediate levels in the Massive Zone, the pellets begin to increase in temperature, i.e. 500–1000° C. and the magnetite begins to reduce to wustite and wustite to metallic iron according to the reactions:

$$Fe_3O_4 \text{ (magnetite)} + CO \rightarrow 3Fe_xO \text{ (wustite)} + CO_2$$

$Fe_xO$ (Wustite)$+CO \rightarrow Fe$ (metallic)$+CO_2$

The relative rate of reduction is the critical test parameter in this section of the Massive Zone. It is measured by a test procedure known as the ISO-reducibility, —i.e. the rate of oxygen removal measured as percent per minute up to the 40% reduction level. The swelling property of the pellet is also very important in this section of the furnace.

At temperatures above 1000° C., the pellet burden begins to soften slightly and at 1100° C. molten slag begins to be produced and flows out with the rise in temperature. A standard reduction test under load (RTuL) is used to evaluate the pellet contraction at this temperature. At temperatures approaching 1200° C., a cohesive layer is formed by the combination of metallic iron which grows in the shell portion, normally referred to as the Cohesive Zone. When the temperature exceeds 1200° C. metallic iron and slag separate and in the vicinity of 1400–1500° C. these begin to melt down (Melting Zone).

Higher grade iron ore pellets containing less than 2% silica can also be used as a feed stock for a coal or gas based direct reduced iron (DRI) process. The DRI processes normally operate at maximum temperatures of from 800 to 1100° C. and the iron oxide pellets are reduced to metallic iron in the solid state below the softening/melting temperature of the iron oxide and gangue constituents in the pellet. The highly metallized pellets, i.e. 92+% metallization, are normally used as melting stock in combination with ferrous scrap for electric arc furnace steelmaking.

Iron ore pellets produced commercially owe their hardness to being fired or indurated at temperatures ranging from 1288 to 1343° C. (2350 to 2450° F.). This high temperature hardening process requires large quantities of heat energy and complicated and expensive processing equipment.

Under current practice, the high temperature firing of iron ore pellets is extremely demanding both technically and economically. The high temperature process requires large quantities of energy, ranging from 350,000 to 1,000,000 Btus and 35 kwh per long ton of pellets, depending on whether the iron oxide in the ore is in the form of magnetite or hematite. The pellet hardening operation consists of large, complicated furnaces, such as the grate-kiln, straight grate or shaft furnace to carry out the heat hardening on a continuous basis. Because of the high capital investment for a large pellet induration facility this approach is economically feasible for large scale operations exceeding one million tons of pellets per year, but not always feasible for smaller capacity operations.

Also a significant environmental problem associated with the high temperature induration process is the high thermal $NO_x$ emission. This is a serious concern for the iron ore producers and pollution control agency.

To overcome these problems and in an effort to reduce the high capital and energy operating costs associated with the conventional high temperature pellet induration process the invention provides a low-temperature hardening process for iron ore pellets that requires uncomplicated equipment and a minimum amount of energy. The green pellets produced by the process of the invention are dried and cured in a continuous drying oven at a maximum temperature of approximately 150° C. (300° F.). This treatment provides the pellets with surface properties that make them resistant to abrasion and weathering.

The prior art has shown use of binder formulations for agglomerating or pelletizing ore individually utilizing polyvinyl alcohol and silica. In particular, U.S. Pat. No. 3,661, 555 to Kusama et al., U.S. Pat. No. 5,472,675 to Polizzotti et al. and U.S. Pat. No. 3,860,414 to Lang et al. disclose use of polyvinyl alcohol as a binder component in producing mineral pellets. U.S. Pat. No. 3,725,032 to Kihlstedt, U.S. Pat. No. 2,884,320 to Johnson and U.S. Pat. No. 4,985,075 to Ohno et al. disclose use of silica as an agglomerating agent in producing mineral pellets.

U.S. Pat. No. 2,833,661 to Iler discloses a formulation comprised of a colloidal silica and a polymer such as polyvinyl alcohol for use as a film-forming coating on paper substrates.

In contrast to the known prior art, the invention provides a binder formulation for use in agglomerating mineral concentrates comprised of both colloidal silica and polyvinyl alcohol. The binder formulation, in preferred applications, was developed for iron ore concentrate and fines suitable for both balling (green pellet formation) and low temperature hardening of the green pellets.

The binder formulation produces iron ore pellets with a bonding structure resistant to 'room temperature' mechanical degradation as well as 'heat loads' under reducing conditions so that the pellets do not decrepitate in subsequent high temperature reduction processes. The low temperature bonding process is an alternative to the high temperature hardening process currently in use in the U.S. and foreign countries for pelletizing iron ore concentrates and fines. The high temperature indurated pellets are used as feedstock for the blast furnace and other direct reduced iron (DRI) processes.

Thus it is a broad object of the invention to provide a binder formulation comprised of both colloidal silica and polyvinyl alcohol to produce hardened iron ore pellets from either magnetite or hematite concentrate or fines, or mixtures of both magnetite and hematite concentrates or fines.

Another object of the invention is to produce iron ore pellets from a low temperature bonding process that have mechanical and metallurgical properties suitable for the same use in ongoing iron and steel-making processes.

A specific object of the invention is to provide a low temperature hardening process that offers the advantages of lower capital costs and less environmental concern than conventional processes. Operating costs will depend on binder costs and requirements for different ore types.

Another specific object of the invention is to provide iron ore pellets produced from the low temperature process that have better reducibility properties than the conventionally made fired pellet because of their higher porosity after the organic binder burns off in the reduction process.

Another object of the invention is to provide a low-temperature process that permits the addition of a carbon source to the hardened pellets to accelerate the reducibility in subsequent iron making processes.

A further object of the invention is to use the binder formulation to agglomerate other mineral concentrates/fines, particularly those that can not be exposed to high temperatures, i.e. such as coal fines.

A further specific object of the invention is to provide iron pellets to be used as feed stock for an on-site coal or gas based direct reduced iron facility.

SUMMARY OF THE INVENTION

In the present invention, these purposes, as well as others which will be apparent, are achieved generally by providing a binder formulation for use in agglomerating mineral concentrates comprised of colloidal silica and a polymeric binder.

The colloidal silica is provided in the formulation by either a water dispersion of silica or in a powder form such as a clay-like mineral montmorillonite or bentonite. The preferred polymeric binder is a water-soluble polyvinyl alcohol. In the binder formulation the colloidal silica and polymeric binder are present in amounts sufficient to provide room temperature strength for transporting a pellet and high temperature strength for use in processes operating at high temperature.

The mineral concentrate of mineral fines are selected from the group consisting of magnetite, hematite and mixtures thereof. In addition, other mineral concentrates/fines, particularly those that can not be exposed to high temperatures, i.e. such as coal fines can be combined with the invention binder to provide desired strength properties.

The invention also provides a mineral pellet and related low temperature hardening process for making the pellet. The process involves mixing the binder formulation, comprised of colloidal silica and a polymeric binder, with the mineral concentrates or fines to be pelletized. Typically, the pellet comprises at least 96 dry wt. % or greater mineral concentrate or mineral fines, preferably between 97 to 98 dry wt. %; colloidal silica in an amount up to 2 dry wt. %, preferably 1 dry wt. %, and the polymeric binder in an amount up to 2 dry wt. %, preferably 1.5 dry wt. %. The pellet is dried at temperatures up to approximately 150° C. (300° F.) to form the hardened pellet.

The pellet formed by the invention process has sufficient room temperature strength to withstand transporting and has sufficient hot temperature strength for use in subsequent iron-making processes. Preferably, the pellets are used as a feed stock in a direct reduction furnace operating at temperatures up to 1100° C. The pellet can also be used in blast furnace or other applications requiring agglomerated feed stocks.

Other objects, features and advantages of the present invention will be apparent when the detailed description of the preferred embodiments of the invention are considered with reference to the drawings, which should be construed in an illustrative and not limiting sense as follows:

DETAILED DESCRIPTION OF THE INVENTION

In accordance with the present invention a binder formulation for use in agglomerating mineral concentrates or fines, comprised of colloidal silica and a polymeric binder is provided. This binder is suitable for both balling (green pellet formation) and low temperature (300° F.) hardening of the green pellets. The binder formulation produces iron ore pellets with a bonding structure resistant to "room temperature" mechanical degradation as well as "heat loads" under reducing conditions so that the pellets do not decrepitate in subsequent high temperature iron making processes.

The mineral pellets of the invention are comprised of mineral concentrates or mineral fines and the binder formulation comprised of colloidal silica and a polymeric binder.

The mineral concentrates or mineral fines are preferably magnetite, hematite and mixtures thereof. However, other mineral concentrates/fines, particularly those that can not be exposed to a high temperatures, i.e. such as coal fines, can be combined with the invention binder to provide desired strength properties. The pellets produced have low temperature strength sufficient for transporting the pellet and high temperature strength sufficient for use in subsequent iron-making processes.

In particular, the invention pellets can be used as a feed stock for an on-site coal or gas-based direct reduced iron facility. In such an application the mechanical strength of the pellets, i.e. compressive strength and abrasion resistance, need not be as strong as the fired pellets which are used primarily in the blast furnace. However, by varying the colloidal silica/polyvinyl alcohol binder mixture, the hardened pellets may also be used in a blast furnace.

Figure 1:
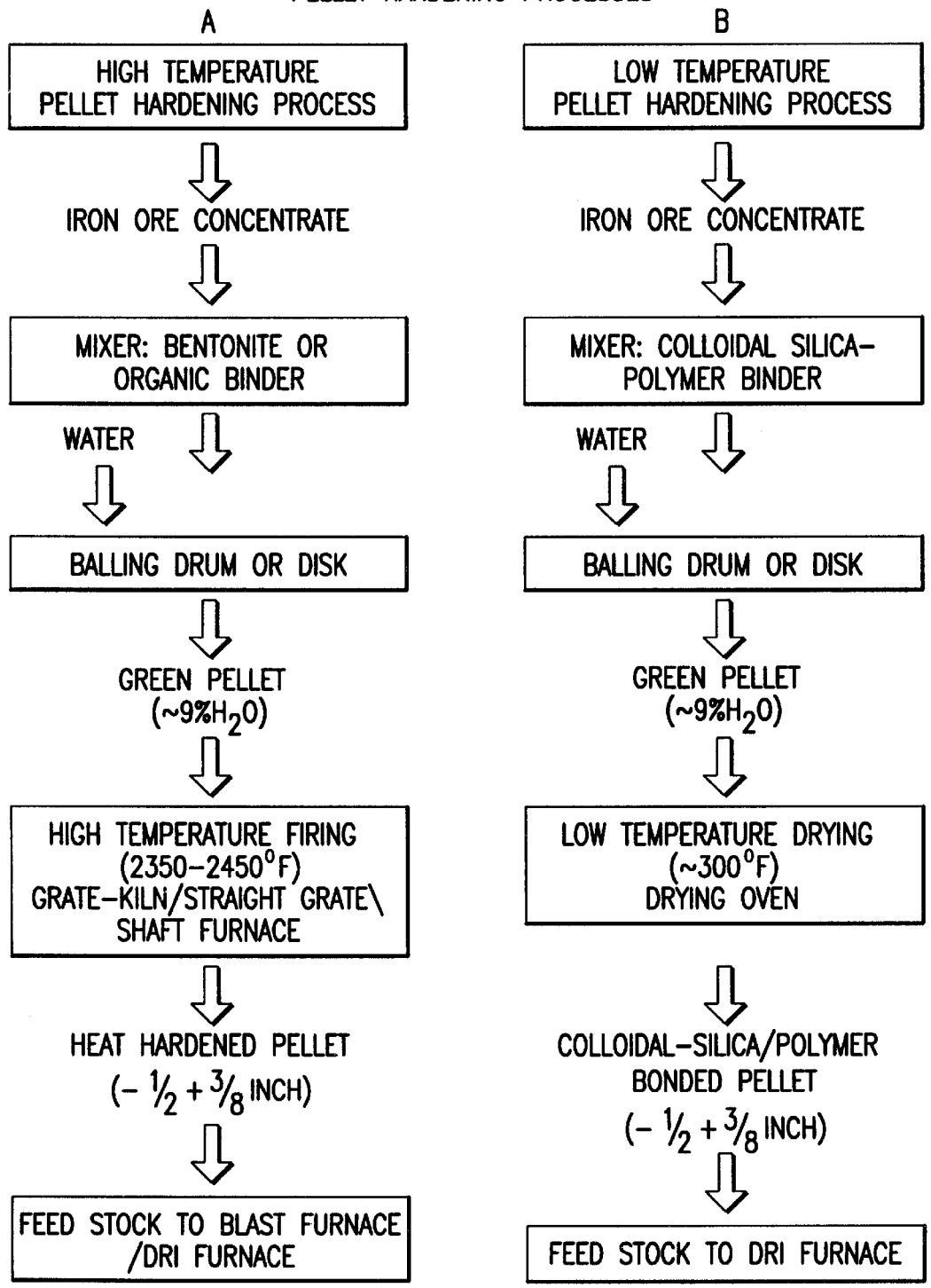
FIGS. 1A and 1B are diagrams comparing the essential steps involved in both the high temperature pellet hardening process (conventional approach) and the low temperature pellet hardening process (invention approach), respectively.

FIGS. 1A and 1B are block diagrams comparing the essential steps involved in a conventional high temperature pellet hardening process and the invention low temperature pellet hardening process.

The water soluble polyvinyl alcohol polymer provides the iron oxide pellet with the mechanical strength properties required for handling and transporting. However, in order for a polymer binder to provide adequate strength for iron ore pellets during the high temperature reduction process it must be able to hold the fine iron oxide particles together until the pellet reaches a temperature in the range of 800–1000° C. at which point the reduction bonding mechanism will begin to take over.

Grain growth is the dominant bonding mechanism in the reduced (metallized) pellet. In the presence of reducing gases (CO and $H_2$) reduction takes place topochemically from the surface with the successive formation (from magnetite) of wustite and metallic iron. At a temperature of 1000° C. the metallic iron content should be well developed in the pellet, but, aside from some surface concentration, the metallic iron grains and those of wustite and silicate gangue are scattered throughout the pellet, resulting in low mechanical strength. However, as the pellet temperature increases (1050–1100° C.), the peripheral concentration of metallic iron increases and the surface layer becomes compacted due to the welding of the adjacent grains near or at the surface. At this point the pellet strength could reach levels in excess of 100 lbs, depending on the thickness and compaction of the peripheral layer and the level of metallization attained.

Other bonding mechanisms can also occur at temperatures around 1000° C. including the sintering of the unreacted magnetite grains (magnetite bonding), and the formation of fayalite slag from the reaction of the wustite and silica in the pellet, according to the following reaction:

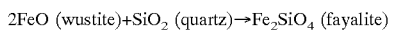

$$2FeO \text{ (wustite)} + SiO_2 \text{ (quartz)} \rightarrow Fe_2SiO_4 \text{ (fayalite)}$$

A minimum binder decomposition temperature of 1000–1050° C. would appear to be adequate for use in standard blast furnace or DRI applications. Most organic polymer binders will burn off before this temperature is reached resulting in pellet degradation. The colloidal silica in the polymer binder formulation assists in producing pellets with a bonding structure resistant to mechanical as well as heat loads so that the pellets do not disintegrate during the high temperature reduction process.

The binder formulation can be used to produce hardened iron ore pellets from either magnetite or hematite concentrate or fines. The iron ore pellets produced from the low temperature bonding process have mechanical and metallurgical properties which could make them suitable as a feedstock for a direct reduction process. The binder formulation could also be used to agglomerate other mineral concentrates/fines, particularly those that cannot be exposed to a high temperature heat treatment.

In general the invention low temperature pellet hardening process uses a colloidal silica, preferably a water dispersed colloidal silica, in combination with a water soluble polyvinyl alcohol polymer to produce high strength iron ore pellets at temperatures below 150° C. (300° F.) in an oxygen (air) atmosphere. As illustrated in FIG. 1B the process consists of three basic steps. These include (1) mixing/blending of the colloidal silica-polymer binder with the dry or wet filter cake concentrate (8–10% moisture) in a conventional mixing device; (2) forming nominal −½+⅜ inch diameter green pellets from the moist concentrate-binder mixture in a standard balling drum or disk; and (3) drying of the green pellets (approximately 9% moisture) at a maximum temperature of 150° C. (300° F.) in a continuous drying oven to insure complete evaporation of the water and curing of the pellets. During the pellet drying and curing process the extremely fine colloidal silica particles (7–22 nanometers) and polymer particles bond to the iron oxide particles and to each other and produce an iron ore pellet with high impact and compressive strength and excellent abrasion resistance. The addition of colloidal silica provides the pellet with the necessary high temperature bonding strength to prevent their abrasion into fines and breakage into fragments during the early stage of high temperature reduction, normally below the temperature at which metallic iron begins to form. This temperature is generally around 1050° C. in the coal-based kiln direct reduction process and about 800° C. in the gas-based direct reduction processes.

The polyvinyl alcohol polymer used in the pellet binder formulation is a water-soluble, fully hydrolyzed (99+%) material and is generally available commercially under various tradenames and from various manufacturers. Representative materials that may be used include, but are not limited to, Elvanol® from DuPont, Wilmington, Del., and Airvol®, from Air Products & Chemicals, Inc. Allentown, Pa., which are fully described in the Technical Data Sheets which are incorporated herein by reference. The polyvinyl alcohol used in the formulations have various degrees of hydrolysis, viscosities and molecular weight depending on the specific applications. These include polyvinyl alcohol polymers with a high degree of hydrolysis and high molecular weight which provide maximum tensile strength, increased adhesion and bonding to hydrophilic surfaces and improved resistance to humidity and water exposure.

The silica component used in the formulations is in colloidal form, preferably in the particle size range of 7 to 22 nanometers. This component is generally commercially available under various trademarks and from various manufacturers. Representative materials that may be used include, but are not limited to, Ludox® colloidal silicas', i.e. LUDOX®SK formulations: SK-G, DP-106, DP-107, DP-108, DP-109, DP-123 and DP-124, all from DuPont, Wilmington, Del. and are fully described in the Technical Data Sheets which are incorporated herein by reference. The Ludox® colloidal silica's are low sodium water dispersions of extremely fine amorphous, negatively charged, silica particles produced via a polymerization process and further contain small amounts of a water soluble polyvinyl alcohol polymer. These binders are generally used in the investment casting industry for "binding" of ceramic shell molds. They are water soluble and waterlike in viscosity and can contain upwards to 30% silica by weight (balance water). Upon drying and evaporation of the water, the silica particles bond to the refractory oxide particles and provide the glue needed to hold the shell mold together.

Nyacol 1440 is a colloidal silica water dispersion supplied by EKA Chemicals, Inc., Marietta, Ga., and is also designed for use in refractory binding applications. Nyacol 1440 is an essentially clear liquid, slightly more viscous than water and contains 40 weight percent silica and with a silica particle size of 14 nanometers.

Amorphous fumed silica powder (100% silica), Aerosil 90 from the Degussa Corp., Ridgefield Park, N.J. may also be used. Aerosil 90 has an average silica particle size of 20 nanometers and a specific surface of 75–105 $m^2/g$ and Aerosil-300 with an average silica particle size of 7 nanometers and a specific surface of 270–330 $m^2/g$. These colloidal silicas are light and fluffy.

The active ingredients in the iron ore pellet binder are polymeric binder, which is preferably polyvinyl alcohol, and colloidal silica. A suitable amount of binder to iron oxide for acceptable "room temperature" pellet compressive strength and high temperature (1000° C.) pellet durability during reduction to metallic iron is from 1 to 4%, or preferably from 1.5 to 2.5%. Pellet compression strength in the range of 200 to 300 lbs (based on −½+⅜ inch diameter pellet) can be produced with polyvinyl alcohol additions of 20 to 40 lbs per ton of concentrate or 1 to 2%, preferably 1 to 1.5%. The corresponding colloidal silica requirements for acceptable high temperature reduction strength is in the range of 10 to 20 lbs or from 0.5 to 1%. As used throughout this specification, unless otherwise specified, when measurements refer to tons, these are short tons which are defined as equal to 2,000 lbs.

Higher colloidal silica additions to the pellet improves their high temperature reduction disintegration properties but have an adverse effect on the room temperature compressive strength. Thus, the balance of the binder components is essential to practicing the invention and producing a pellet of the desired strength. As mentioned, a preferred source of colloidal silica is from a water dispersion of silica. However, the colloidal silica may also be provided in solid form such as a clay-like mineral montmorillonite or as bentonite, both materials are incorporated into the formulations in powder form.

Typically, the mineral pellet comprise at least 96 dry wt. % or greater of the mineral concentrates or fines, preferably 97 to 98 dry wt. %; colloidal silica in amounts up to 2 dry wt. %, preferably 1 dry wt. %; and the polymeric binder in amounts of to 2 dry wt. %, preferably 1.5 dry wt. %. In general, factors affecting pellet strength are the particle size of the colloidal silica and the degree of water solubility of the polyvinyl alcohol-colloidal silica binder solution.

To understand the present invention more fully, the following examples of the binder formulations and resulting mineral pellets made in accordance with this invention are described below. Specifically, Example 1 shows a colloidal silica binder used to bond magnetite pellets; Examples 2 and 3 illustrate increasing polymer content of the binder and effect on pellet compressive strengths; Example 4 tested the reduction characteristics of the mineral pellets of the invention; and Example 5 shows the binder formulations of the invention in the production of iron ore pellets. These examples are for purposes of illustration only and this invention should not be considered to be limited by any recitation used therein.

As used in the examples below, unless specified otherwise, two commercial grade iron ore concentrates were used in the low temperature pellet bonding tests. Most of the tests were conducted with a high grade Minnesota magnetite taconite concentrate containing 4.5 percent silica. Comparison tests were also conducted with a high grade hematite concentrate obtained from Hoogovens Ijmuniden, Netherlands. Both concentrates contained over 66% Fe with a size consist of 85–90%—44 micrometers.

EXAMPLE I

Performance of Collodial Silica Binder for Cold Bonding of Mangnetite Taconite Pellets In this example the use of colloidal silica polymer as binding agent for agglomerating (balling) fine magnetite taconite concentrates was tested in comparison to the high temperature pellet induration process presently used exclusively throughout the North American Iron Ore industry.

Commercial green (wet) pellets produced from a magnetite taconite concentrate were used for this example. The "as received" green balls were nominal ⅜-inch diameter and contained 1% bentonite. The green balls had a moisture content of 9.5% and an average dry compressive strength of 6 pounds. Binder formulation 1 was used in this example and comprises 18% silica by weight and 1.5% polyvinyl alcohol (commercially available as LUDOX®SK-G from DuPont, Wilmington, Del.).

Two different approaches were used to apply the binder formulation to the green magnetite balls. In the first series of trials (Test Nos. 1 to 3) approximately 30 of the "as received" magnetite green balls were oven dried at 250° F. for 60 minutes to remove all the moisture.

The dried balls were then fully immersed in the binder solution for 30 minutes. In Test No. 1 full strength binder solution was used. In Test No. 2 the binder solution was diluted with tap water to one-half its original strength, i.e. 1 part binder and 1 part tap water (by volume). In Test No. 3 the binder was diluted to one-third strength, i.e. 1 part binder and 2 parts tap water (by volume). Test No. 3 was discontinued because of decrepitation of the green balls during the immersion treatment. Little or no green ball decreptitation was observed in Test Nos. 1 and 2.

After the soak treatment with the binder solution the balls were oven dried at 250° F. for one hour. The green balls were weighed before and after treatment with the binder solution and again after drying. Compressive strength measurements were made on the balls after drying using a mechanical operated spring scale. The average of 10 balls was used as a measure of the compressive strength.

In the second series of trials (Test Nos. 4 and 5) the binder solution was admixed with the ground pellet fines and the mixture blended for 10 minutes with an electric mixer. The mixture was then hand rolled into nominal ½-inch diameter balls. Two different methods were used to make the balls.

In Test No. 4 the binder solution was added to as received pellet fines (9.5% $H_2O$) at a dosage equivalent to 35 lb. binder/long ton magnetite fines (Long tons equal 2240 lbs.). The addition provided a green ball moisture of 12.5%, the minimum moisture required to satisfactorily hand form the balls.

In Test No. 5 the binder solution was added to dry pellet fines. In order to obtain the 12.5% moisture needed to hand form the balls from the dry fines, a binder dosage equivalent to 365 lb./long ton magnetite fines was required. This latter test resulted in an excessive addition of the binder but represents the maximum ball strength that can be achieved with the binder solution. Also, Test No. 5 compressive strength measurements were made on both "air dried" and "oven dried" balls to determine the effect of the drying temperature.

Data from these tests are summarized in TABLE 1. Dry "green" balls impregnated with full strength binder solution (Test No. 1) reported compressive strengths less than 10 lbs in spite of the exceptionally high binder absorption levels. Also no significant strength difference was observed with the diluted strength binder solution (Test No. 2).

Admixing the binder solution with the wet or dry pellet fines prior to balling appears to be the preferred approach, although the ball strengths were rather low, i.e. less than 50 lbs. in spite of the large additions of binder solution (Tests 4 and 5). The compressive strength of the balls almost doubled when air drying rather than oven drying was used (Test 5).

From the data obtained Binder formulation 1 (1.5% PVOH/18% silica) alone, is not suitable for cold-bonding of magnetite taconite pellets. In spite of the high binder addition levels, the pellet strengths were considerably below the 500 lbs compressive strength obtained from the high temperature pellet induration process.

TABLE 1

COMPRESSIVE STRENGTH OF
SILICA/BONDED MAGNETITE PELLETS

| TEST NO. | BINDER 1 ADDITIONS (Equivalent lb binder/long ton magnetite fines) | AVERAGE PELLET COMPRESSIVE STRENGTH (lbs)[1] | |
|---|---|---|---|
| | | OVEN DRIED[2] | AIR DRIED[3] |
| | BINDER 1 IMPREGNATED GREEN PELLETS | | |
| 1 | 206 | 8.8 | N.A. |
| 2 | 140 | 8.6 | N.A. |
| | ADMIXED BINDER 1 & MAGNETIC FINES | | |
| 4 | 35 | 17.8 | N.A. |
| 5 | 365 | 27.1 | 52.2 |

KEY:
[1] represents average of 10 pellets;
[2] oven dried at 250° F. for 1 hour; and
[3] air dried at 70° F. for 24 hours.

EXAMPLE 2

In this example, binder formulations having varying amounts of polymeric binder and colloidal silica components were prepared in accordance with the invention and were tested for compressive strength. The binder formulations tested in this example are:

Binder formulation 2 comprising 5% polyvinyl alcohol and 12% colloidal silica (commercially available as Ludox DP-106 from DuPont, Wilmington, Del.); and Binder formulation 3 comprising 8% polyvinyl alcohol and 5% colloidal silica (commercially available as Ludox DP-107 from DuPont, Wilmington, Del.)

The increased polymer content of the binder solutions 2 and 3 were expected to improve the compressive strength of the pellet over that obtained in Example 1 with the binder formulation 1. The binder formulation 1 contained 1.5% polyvinyl alcohol and 18% silica and when added to the concentrate at full strength (equivalent to 365 lb/ton pellets) produced pellet compressive strengths of less than 50 lbs.

In determining the maximum pellet strength attainable, the "as received" binder solutions 2 and 3 were each added to the dry magnetite concentrate until the mixture was of sufficient consistency to enable it to be hand rolled into nominal ⅝-inch diameter balls. The total moisture level required to form the balls averaged about 13%.

When used at full strength the binders 2 and 3 pellet dosage levels were exceptionally high, exceeding 300 lbs. of binder per ton on pellets. In subsequent trials the "as received" binder solutions were diluted with tap water to concentration levels of 50%, 20% and 10%, providing dosages of 150, 55 and 30 lbs of binder per ton of pellets, respectively. In all test trials the "green balls" were oven dried at 150° F. for two hours. Compressive strength measurements were made on the oven dried pellets.

The test results of this example indicate that increasing the polymer concentration of the binder (i.e. polymer content of the pellet) results in improved compressive strengths. At an equivalent dosage level of 300 lbs. of binder per ton of pellets, the binder formulation 3 (8% PVOH) gave an average pellet compressive strength of about 160 lbs. (200 lbs. max.). Most of these pellets could withstand at least one drop from a height of 25 ft. on a cement slab without breaking. On a second drop from this same distance, they would normally crack in half but not disintegrate. Corresponding compressive strengths at this same pellet dosage level with binder formulation 2 (5% PVOH) and binder formulation 1 (1.5% PVOH) were 70 lbs. and 50 lbs., respectively.

When the dosage level was reduced to about 150 lbs. binder per ton of pellets the pellet compressive strengths with binder formulation 3 (8% PVOH) decreased to about 80 lbs. The corresponding compressive strength values for binder formulation 2 (5% PVOH) and binder formulation 1 (1.5% PVOH) at this same dosage level were 40 lbs. and 20 lbs., respectively. When the binder dosage level in the pellet was reduced to 50 lbs. of binder per ton of pellets the pellet compressive strengths for all three binder formulations were less than 30 lbs.

EXAMPLE 3

A series of iron oxide pellet binding tests were conducted with three additional binder formulations prepared in accordance with the invention. The formulations were as follows:

Binder formulation 4 comprised 8% polyvinyl alcohol and 6% colloidal silica (commercially available as Ludox DP-108 from DuPont, Wilmington, Del.);

Binder formulation 5 comprised 8% polyvinyl alcohol and 7% colloidal silica (commercially available as Ludox DP-109 from DuPont, Wilmington, Del.)

Binder formulation 6 comprised a 100% polyvinyl alcohol polymer (commercially available as Elvanol 90–50 from DuPont, Wilmington, Del.)

Binder formulation 6 was evaluated alone and in combination with binder formulation 1, described in Example 1, to improve the pellet cold strength. This combined formulation was tested to see if the necessary high temperature strength properties were obtained.

TABLE 2 summarizes the binder formulations tested in Examples 1, 2 and 3. Binder formulations 4 and 5 contain the same concentration of polyvinyl alcohol and colloidal silica formulation 3 but with increasing silica particle size. Binder formulation 5 has an average silica particle size of 22 nanometers (specific surface area of 140 m²/g) as compared to formulations 1, 2 and 3 with an average silica particle size of 7 nanometers (specific surface area of 345 m²/g). The coarser silica with a lower specific surface area absorbs less of the polyvinyl alcohol polymer and leaves more "active" polyvinyl alcohol polymer sites available to bond with the iron oxide particles, thus providing greater pellet "cold" strength.

TABLE 2

BINDER FORMULATIONS

| POLYMER DESIGNATION | BINDER 1 | BINDER 2 | BINDER 3 | BINDER 4 | BINDER 5 | BINDER 6 |
| --- | --- | --- | --- | --- | --- | --- |
| POLYMER FORM "AS RECEIVED" | LIQUID | LIQUID | LIQUID | LIQUID | LIQUID | POWDER |
| POLYVINYL ALCOHOL CONTENT % | 1.5 | 5.0 | 8.0 | 8.0 | 8.0 | 100 |
| AMORPHOUS SILICA CONTENT % | 18 | 12 | 5 | 6 | 7 | 0 |
| AVERAGE SILICA PARTICLE SIZE, NANOMETERS | 7 | 7 | 7 | 12 | 22 | 13 |

As seen from TABLE 3 below (Test 3) iron oxide pellets made with binder formulation 5 had a higher compressive strength and drop number than those made with binder formulation 3 (Test 1) and binder formulation 4 (Test 2) at equivalent polymer addition levels. However, even at the high polymer loading of (266 lb/ton) the maximum pellet strength was less than 115 lbs. When the polymer addition was decreased to 133 lb./ton, the pellet compressive strength decreased by 50% (Test 4).

From the results in Examples 1 and 2 with binder formulations 1 and 2, the colloidal silica polymer alone does not provide adequate "room" temperature strength for iron oxide pellets.

did not appreciably increase the pellet compressive strength but did improve the drop number. This combination of polymers gave higher pellet strengths than those obtained with 100% polyvinyl alcohol (binder formulation 6 TABLE 4–Test 5)) or with a one-to-one ratio of binder 6 and binder 1 (TABLE 4–Test 12)

TABLE 3

COMPARISON OF PELLET STRENGTH WITH THE BINDER FORMULATIONS

| Test Number | 1 | 2 | 3 | 4 |
|---|---|---|---|---|
| Binder Formulation | BINDER 3 | BINDER 4 | BINDER 5 | BINDER 5 |
| POLYMER STRENGTH % | 100 | 100 | 100 | 50[3] |
| POLYMER ADDITION (lb/ton) | 266 | 266 | 266 | 133 |
| GREEN PELLET MOISTURE % | 7.8 | 8.2 | 10.0 | 9.5 |
| PELLET COMPRESSIVE STRENGTH[1] (lb) | | | | |
| 1 | 80 | 90 | 100 | 50 |
| 2 | 50 | 70 | 120 | 50 |
| 3 | 70 | 85 | 130 | 60 |
| 4 | 80 | 70 | 100 | 75 |
| 5 | 80 | 70 | 120 | 50 |
| 6 | 100 | 80 | 130 | 50 |
| 7 | 70 | 80 | 100 | 60 |
| 8 | 70 | 70 | 110 | 50 |
| 9 | 70 | 80 | 100 | 50 |
| 10 | 60 | 95 | 120 | 60 |
| AVERAGE | 73 | 73 | 113 | 56 |
| PELLET DROP NUMBER[2] | 1 | 2 | 4 | 0 |

KEY:
[1]Oven dried at 200 ° F. for two hours;
[2]Number of drops from a height of approximately 25 feet before breaking; and
[3]"As received" polymer diluted with 50% distilled water A series of additional tests were conducted to determine if the addition of more polyvinyl alcohol to the colloidal silica would increase the "room" temperature pellet strength at a lower polymer addition level. Binder formulation 6 which is a polyvinyl alcohol polymer was evaluated alone and in combination with binder formulation 1 at ratios of both one and two parts (by weight) of binder formulation 6 to binder formulation 1. The results of these tests are summarized in TABLES 4 and 5. Although the binder formulation 6 was received in a powdered form, it is only moderately soluble in water at room temperature and cannot be added directly to the moist filter cake concentrate. In order to utilize binder formulation 6 effectively, it had to be dissolved in hot water (200° F. approximately 10 to 15 minutes) before adding to the dry magnetite concentrate. This mixture was rolled into –½+⅜ inch diameter "green balls", with the final moisture content averaging about 11.5%. The green balls were dried at 200° F. for 2 hours and the compressive strengths and drop number determined.

The results indicate that the highest pellet compressive strength and drop number are obtained with a ratio of two parts formulation 6 to one part formulation 1. TABLE 5 shows test results with this polymer combination at addition levels ranging from approximately 12 to 94 lb/ton of concentrate. As shown in the data, a polymer addition of at least 40 to 45 lb/ton (Tests 6 and 11) is needed to achieve pellet compression strengths in excess of 200 lbs and a drop number over 8. Higher addition of the polymer mix (Test 13)

TABLE 4

COMPARISON OF PELLET STRENGTHS WITH BINDER FORMULATIONS 1, 5 & 6

| Test Number | 8 | 5 | 7 | 12 | 10 |
|---|---|---|---|---|---|
| POLYMER COMPOSITION % | | | | | |
| BINDER FORMULATION 1 | 0 | 0 | 50 | 50 | 0 |
| BINDER FORMULATION 5 | 0 | 0 | 0 | 0 | 50 |
| BINDER FORMULATION 6 | 100 | 100 | 50 | 50 | 50 |
| POLYMER ADDITION (lb/ton) | 20.8 | 46.9 | 31.3 | 46.9 | 31.3 |
| GREEN PELLET MOISTURE % | 11.3 | 13.8 | 10.0 | 11.0 | 9.3 |
| PELLET COMPRESSIVE STRENGTH[1] (lb) | | | | | |
| 1 | 80 | 150 | 105 | 70 | 80 |
| 2 | 70 | 150 | 85 | 85 | 70 |
| 3 | 70 | 170 | 95 | 85 | 65 |
| 4 | 80 | 200 | 125 | 90 | 70 |
| 5 | 90 | 200 | 110 | 80 | 80 |
| 6 | 75 | 200 | 110 | 80 | 65 |
| 7 | 70 | 185 | 90 | 75 | 70 |
| 8 | 80 | 155 | 90 | 80 | 65 |
| 9 | 70 | 160 | 80 | 70 | 70 |

TABLE 4-continued

COMPARISON OF PELLET STRENGTHS WITH BINDER FORMULATIONS 1, 5 & 6

| Test Number | 8 | 5 | 7 | 12 | 10 |
|---|---|---|---|---|---|
| 10 | 70 | 140 | 85 | 75 | 70 |
| AVERAGE | 76 | 171 | 98 | 79 | 71 |
| PELLET DROP NUMBER[2] | 0/1 | 5/6 | 0/1 | 0/1 | 0/1 |

KEY:
[1]Oven dried at 200° F. for two hours;
[2]Number of drops from a height of approximately 25 feet before breaking; and

TABLE 5

COMPARISON OF PELLET STRENGTHS WITH BINDER FORMULATIONS 1 & 6

| Test Number | 9E | 9D | 9C | 6 | 11 | 13 |
|---|---|---|---|---|---|---|
| POLYMER COMPOSITION % | | | | | | |
| BINDER FORMULATION 1 | 33.3 | 33.3 | 33.3 | 33.3 | 33.3 | 33.3 |
| BINDER FORMULATION 6 | 66.7 | 66.7 | 66.7 | 66.7 | 66.7 | 66.7 |
| POLYMER ADDITION (lb/ton) | 11.8 | 23.5 | 31.3 | 41.7 | 46.9 | 93.8 |
| GREEN PELLET MOISTURE % | 13.1 | 10.2 | 11.9 | 11.2 | 10.5 | 12.5 |
| PELLET COMPRESSIVE STRENGTH[1](lb) | | | | | | |
| 1 | 60 | 70 | 85 | 210 | 200 | 240 |
| 2 | 50 | 80 | 80 | 245 | 215 | 200 |
| 3 | 50 | 80 | 75 | 265 | 200 | 215 |
| 4 | 50 | 90 | 80 | 255 | 180 | 270 |
| 5 | 50 | 85 | 85 | 225 | 200 | 200 |
| 6 | 50 | 70 | 95 | 245 | 230 | 230 |
| 7 | 50 | 80 | 85 | 285 | 200 | 310 |
| 8 | 50 | 100 | 75 | 240 | 225 | 260 |
| 9 | 50 | 80 | 70 | 260 | 195 | 200 |
| 10 | 40 | 75 | 80 | 245 | 185 | 215 |
| AVERAGE | 50 | 81 | 81 | 248 | 203 | 234 |
| PELLET DROP NUMBER[2] | 0/1 | 0/1 | 1 | 9/10 | 8/9 | 14/15 |

KEY:
[1]Oven dried at 200° F. for two hours;
[2]Number of drops from a height of approximately 25 feet before breaking; and

EXAMPLE 4
Reduction Test of the Mineral Pellets

The reduction characteristics of the polymer-bonded magnetite pellets was evaluated. Particularly their durablity or resistance to thermal and reduction degradation resulting form pellet abrasion into fines and breakage into fragments during the early stages of reduction, normally below the temperature at which metallic iron begins to form. This temperature is generally around 1050° C. in the coal-based kiln processes and about 800° C. in the gas-based processes.

In this example, laboratory scale rotary drum tests simulating a coal-based rotary kiln direct reduced iron process operating at a maximum temperature of 1100° C. were conducted on selected polymer-bonded pellets made in accordance with the invention process. Prior to conducting the high temperature reduction tests additional polymer-bonded magnetite taconite pellets were made with various combinations of polymeric binder and colloidal silica components. The tests are summarized in TABLES 6A and 6B below (Tests 14 to 26).

In addition to the binder formulations 1 to 6 used in the previous example, another binder formulation 7 was tested. Binder formulation 7, is similar to binder formulation 6, and is comprised a 100% polyvinyl alcohol polymer (commercially available as Elvanol 85-30 from DuPont, Wilmington, Del.). The test results with formulation 7 did not show any noticeable improvement in the pellet compressive strengths over binder formulation 6, when added either alone as a liquid (Test 16–TABLE 6A) or in a powdered form (Test 20–TABLE 6B) or in combination with binder formulation 1 (Tests 14 & 15–TABLE 6A). At equivalent dosage levels the binder formulation 6 was superior to binder formulation 7 in providing higher room temperature compressive strengths.

TABLE 6A

PELLET STRENGTHS OBTAINED WITH VARIOUS POLYMER COMPOSITIONS

| Test Number | 14 | 15 | 16 | 17 | 18 | 19 |
|---|---|---|---|---|---|---|
| POLYMER COMPOSITION % | | | | | | |
| BINDER FORMULATION 1 | 33.3 | 50.0 | — | 33.3 | — | — |
| BINDER FORMULATION 5 | — | — | — | — | — | — |
| BINDER FORMULATION 6 | — | — | — | 66.7 | 100[4] | 100[4] |
| BINDER FORMULATION 7 | 66.7 | 50.0 | 100 | — | — | — |
| POLYMER ADDITIVE (lb/ton) | 41.7 | 31.3 | 31.2 | 40.0 | 62.5 | 31.3 |
| GREEN PELLET MOISTURE % | 17.9 | 16.8 | 18.2 | 11.3 | 15.7 | 15.6 |
| PELLET COMPRESSIVE STRENGTH[1] (lb) | | | | | | |
| 1 | 50 | 40 | 40 | 90 | 200 | 100 |
| 2 | 70 | 50 | 40 | 100 | 300 | 70 |
| 3 | 70 | 40 | 50 | 80 | 189 | 80 |
| 4 | 40 | 50 | 50 | 90 | 150 | 60 |
| 5 | 70 | 50 | 50 | 80 | 250 | 50 |
| 6 | 70 | 70 | 50 | 100 | 350 | 70 |
| 7 | 70 | 50 | 50 | 110 | 240 | 60 |
| 8 | 70 | 40 | 40 | 90 | 230 | 90 |
| 9 | 60 | 40 | 50 | 80 | 180 | 70 |
| 10 | 50 | 40 | 60 | 80 | 220 | 70 |
| AVERAGE | 62 | 47 | 48 | 90 | 230 | 72 |
| PELLET DROP NUMBER[2] | 0/1 | 0/1 | 0/1 | 3 | 12–15 | 1 |

KEY:
[1]Oven dried at 200° F. for two hours;
[2]Number of drops from a height of approximately 25 feet before breaking; and
[3]"As received" polymer diluted with 50% distilled water;
[4]Polyvinyl alcohol added in a powder form;
[5]10% Charcoal addition to concentrate mix.

TABLE 6B

PELLET STRENGTHS OBTAINED WITH VARIOUS POLYMER COMPOSITIONS

| Test Number | 20 | 21[5] | 22 | 23 | 24 | 25 | 26 |
|---|---|---|---|---|---|---|---|
| POLYMER COMPOSITION % | | | | | | | |
| BINDER FORMULATION 1 | — | 33.3 | 33.3 | 66.7 | 100.0 | 50.0 | — |
| BINDER FORMULATION | — | — | — | — | — | — | 50.0 |
| BINDER FORMULATION 6 | — | 66.7[4] | 66.7[4] | 33.3 | — | 50.0 | 50.0 |
| BINDER FORMULATION 7 | 100[4] | — | — | — | — | — | — |
| POLYMER ADDITIVE (lb/ton) | 31.3 | 46.9 | 41.7 | 83.3 | 62.5 | 62.5 | 62.5 |
| GREEN PELLET MOISTURE % | 15.9 | 19.7 | 13.2 | 10.8 | 12.1 | 12.8 | 12.1 |
| PELLET STRENGTH[1] (lb) | | | | | | | |
| 1 | 60 | 50 | 80 | 120 | 10 | 110 | 130 |
| 2 | 50 | 30 | 90 | 120 | 10 | 130 | 130 |
| 3 | 170 | 20 | 80 | 100 | 10 | 130 | 130 |
| 4 | 30 | 30 | 100 | 90 | 10 | 150 | 140 |
| 5 | 80 | 30 | 120 | 90 | 10 | 140 | 140 |
| 6 | 90 | 30 | 90 | 100 | 10 | 140 | 150 |
| 7 | 40 | 30 | 80 | 100 | 10 | 160 | 140 |
| 8 | 60 | 30 | 90 | 130 | 10 | 100 | 130 |
| 9 | 50 | 30 | 100 | 90 | 10 | 110 | 150 |
| 10 | 20 | 20 | 90 | 160 | 10 | 140 | 130 |
| AVERAGE | 65 | 30 | 92 | 110 | 10 | 130 | 137 |
| PELLET DROP NUMBER[2] | 0/1 | 0/1 | 1 | 3 | 0 (dust) | 3/4 | 6/7 |

KEY:
[1] Oven dried at 200° F. for two hours;
[2] Number of drops from a height of approximately 25 feet before breaking; and
[3] "As received" polymer diluted with 50% distilled water;
[4] Polyvinyl alcohol added in a powder form;
[5] 10% Charcoal addition to concentrate mix.

As in the previous examples, the "as received" binder formulation 6 powder was dissolved in hot water prior to its addition to the magnetite concentrate. This was done because binder formulation 6 powder was only slightly soluble in water at room temperature. In Tests 18, 19, 21 and 22 the binder formulation 6 was added to the magnetite concentrate in a powdered form. At the highest binder dosage level the pellet compressive strength and 25-foot drop number were both very good (see Test 18). However, at the lower addition levels (Test 19) and in combination with binder formulation 1 (Tests 21 and 22) the pellet compressive strength and drop numbers at equivalent dosages were generally lower than those obtained with polyvinyl alcohol added in the liquid form. As a result, only pellets made with liquid polyvinyl alcohol were used in the reduction tests.

The performance of the polymer-bonded magnetite pellet during high temperature reduction was tested in a series of small scale tests conducted in a laboratory drum furnace. The inconel drum was 3 inches in diameter and 6.5 inches in length and contained three ¼-inch horizontal lifter bars. It was heated externally in an electric furnace and regulated with an automatic temperature controller. The standard charge to the drum consisted of 100 grams of the polymeric-bonded pellets (i.e. approximately 29 to 36 pellets) and 100 grams of minus 3 plus 4 mesh subbituminous coal. The pellets and coal were charged into the drum before it was placed into the furnace. In each test the drum was heated to a maximum temperature of 1100° C. over a period of one hour and held at this temperature for an additional 15 to 60 minutes to insure a high degree of pellet metallization.

Throughout the test, the drum was rotated at 25 RPM. All of the polymer-bonded pellets evaluated in the reduction tests were made from a magnetite taconite concentrate containing approximately 4% silica. The pellets were a nominal –½+⅜-inch diameter with room temperature compressive strengths ranging from about 115 to 250 lbs. The characteristics of the polymer-bonded pellets used in these reduction tests are found in the previous Tables 1 to 6. A base-line reduction test (Test R-O) was also conducted with a plant indurated magnetite taconite (hematite) pellet with an average compressive strength of 590 lbs for comparison purposes.

After the reduction tests were completed, the drum was removed from the furnace and the contents allowed to cool to room temperature. The metallized material and unreacted coal char were removed from the drum and separated with a hand magnet. The metallized material was screened on a 4-mesh (4.7 mm) sieve and the plus 4 mesh and the minus 4 mesh fractions weighed to determine the extent of pellet degradation. In these reduction tests, pellet durability was defined as the percentage of whole pellets and pellet fragments in the metallized product that were larger than 4 mesh and was calculated according to the equation:

$$\% \text{ pellet durability} = \frac{\text{weight of plus 4 mesh metallized fraction}}{\text{weight of total metallized material}} \times 100$$

An estimation of the pellet metallization was made by cutting the reduced pellets in half with a diamond saw and observing the extent of the metallic surface. It appeared from these observations that the reduced pellets were well over 80% metallized. Compressive strengths were also determined on the metallized pellets.

The results of the reduction tests on selected polymer-bonded magnetite pellets are summarized in TABLES 7A and 7B. The pellets from Tests 3, 5, 6, 23, 24, 25 and 26 were selected for high temperature reduction evaluation because they contain various additions of binder formulations 1, 5 and 6 either alone or in combination with each other. Pellets from these tests also had some of the higher room temperature compressive strengths and drop numbers.

TABLE 7A

REDUCTION TEST RESULTS ON SELECTED POLYMER-BONDED MAGNETITE PELLETS IN LABORATORY ROTARY DRUM FURNACE

| TEST NO. | R-0[1] | R-3 | R-6 | R-6 |
|---|---|---|---|---|
| POLYMER ADDITION (lb/ton) | | | | |
| BINDER 1 | — | — | — | 13.9 |
| BINDER 5 | — | 266 | — | — |
| BINDER 6 | — | — | 46.9 | 27.8 |
| TOTAL POLYMER ADDITION | — | 266 | 46.9 | 41.7 |
| POLYMER SILICA ADDITION, lb/ton | 11–12[2] | 18.6 | 0 | 2.5 |
| PELLET COMPRESSIVE STRENGTH, lb | 590 | 113 | 171 | 248 |
| PELLET DROP NO. | HIGH | 4 | 5/6 | 9/10 |
| REDUCTION TEST CONDITIONS | | | | |
| MAX. TEMP. °C. | 1100 | 1100 | 1100 | 1100 |
| TIME TO REACH TEMP, min | 60 | 60 | 60 | 60 |
| TIME AT TEMP, min | 60 | 15 | 15 | 60 |
| FEED TO ROTARY DRUM | | | | |
| PELLET WEIGHT, g | 99.8 | 100.4 | 101.3 | 99.8 |
| NO. OF PELLETS | 41 | 30 | 34 | 31 |
| SUB-BIT COAL, wt, g | 100.0 | 100.1 | 100.1 | 100.2 |
| DISCHARGE FROM ROTARY DRUM | | | | |
| PELLET WT. LOSS, % | 27.2 | 22.2 | 40.7 | 39.9 |
| COAL WT. LOSS, % | 73.4 | 66.4 | 71.3 | 69.6 |
| TOTAL WT. LOSS, % | 50.4 | 44.3 | 44.1 | 54.7 |
| PELLET DURABILITY, % | 86.7 | 90.7 | 39.3 | 41.7 |
| UNBROKEN PELLETS, % | 100 | 100 | 70 | 19 |
| PELLET COMPRESSIVE STRENGTH, lb | 137 | 176 | 50 | 143 |
| OBSERVATIONS ON FINAL METALLIEED PRODUCT | Large surface cracks | Unreduced oxide core in center of pellet | Small pellets - soft & spongy | Highly abraded pellets |

KEY:
[1]Base-line test with commercial indurated magnetite taconite pellets;
[2]Assumes 20 lb/ton bentonite addition.

TABLE 7B

REDUCTION TEST RESULTS ON SELECTED POLYMER-BONDED MAGNETITE PELLETS IN LABORATORY ROTARY DRUM FURNACE

| TEST NO. | R-23 | R-24 | R-25 | R-26 |
|---|---|---|---|---|
| POLYMER ADDITION (lb/ton) | | | | |
| BINDER 1 | 55.6 | 62.5 | 313 | — |
| BINDER 5 | — | — | — | 31.3 |
| BINDER 6 | 27.2 | — | — | 31.3 |
| TOTAL POLYMER ADDITION | 83.3 | 62.5 | 313 | 62.5 |
| POLYMER SILICA ADDITION, lb/ton | 10 | 11.3 | 5.6 | 2.5 |
| PELLET COMPRESSIVE STRENGTH, lb | 110 | 10 | 130 | 137 |
| PELLET DROP NO. | 3 | 0 | 3/4 | 6/7 |
| REDUCTION TEST CONDITIONS | | | | |
| MAX. TEMP. °C. | 1100 | 1100 | 1100 | 1100 |
| TIME TO REACH TEMP, min | 60 | 60 | 60 | 60 |
| TIME AT TEMP, min | 15 | 15 | 30 | 30 |
| FEED TO ROTARY DRUM | | | | |
| PELLET WEIGHT, g | 100.2 | 101.4 | 100.7 | 100.3 |
| NO. OF PELLETS | 35 | 32 | 36 | 35 |
| SUB-BIT COAL, wt, g | 100.0 | 100.2 | 100.0 | 100.0 |

TABLE 7B-continued

REDUCTION TEST RESULTS ON SELECTED POLYMER-BONDED MAGNETITE PELLETS IN LABORATORY ROTARY DRUM FURNACE

| TEST NO. | R-23 | R-24 | R-25 | R-26 |
|---|---|---|---|---|
| DISCHARGE FROM ROTARY DRUM | | | | |
| PELLET WT. LOSS, % | 31.1 | 35.5 | 28.3 | 40.9 |
| COAL WT. LOSS, % | 70.8 | 68.2 | 74.0 | 72.2 |
| TOTAL WT. LOSS, % | 50.9 | 51.7 | 48.8 | 43.5 |
| PELLET DURABILITY, % | 81.2 | 11.9 | 68.8 | 69.0 |
| UNBROKEN PELLETS, % | 100 | 0 | 92 | 91 |
| PELLET COMPRESSIVE STRENGTH, lb | 122 | — | 124 | 90 |
| OBSERVATIONS ON FINAL METALLIZED PRODUCT | Low abraded pellets | No remaining pellets - mostly metallized fines | Moderate abraded pellets | Moderate abraded pellets - higher metallization |

Pellet durability and the number (%) of unbroken pellets remaining after reduction were the two main criteria used to evaluate the high temperature reduction disintegration properties of the polymer-bonded pellets. These were compared to the results obtained with a base-line test conducted on plant indurated magnetite taconite (hematite) pellets. The plant pellets (Test R-O) gave a pellet durability of about 87% and 100% unbroken pellets. These base-line pellets were well metallized and even though they contained numerous surface cracks, had compressive strengths of over 135 lbs.

Unlike, the plant indurated metallized pellets, none of the polymer-bonded metallized pellets showed any visual surface cracks and their compressive strengths were generally comparable to the metallized base line pellets. The polymer bonded pellets containing an inordinately high dosage of binder formulation 5 (Test R-3) gave a pellet durability of 90% with 100% unbroken pellets. These reduced pellets had compressive strengths over 175 lbs. but were not as highly metallized as the base-line pellets. Inspection of the cut metallic surface showed that the pellet contained a core of unreacted iron oxide. Test R-23, which contained two parts binder 1 and one part binder 6 at a total dosage of 83 lb/ton showed durability comparable to the base-line pellets.

Polymer bonded pellets containing binder 1 at a dosage level of 62.5 lb/ton (Test R-24) broke down completely during the reduction process. These pellets have low room temperature compressive strength of about 10 lbs, which was not sufficient to survive the tumbling action of the rotary drum. Polymer bonded pellets containing binder 6 also performed poorly under high temperature reducing conditions in spite of their high compressive strengths and drop number.

Polymer bonded pellets containing 50% binder 1 and 50% binder 6 (Test R-25) reported about the same degree of reduction disintegration as pellets containing an equivalent ratio of binder 5 and binder 6 (Test R-26). The reduced pellets from both of these tests showed moderate abrasion, with a durability index of approximately 69% and about 90% unbroken pellets. It appeared that the reduced pellets from Test R-26 were more highly metallized, which could be attributed to the lower silica contamination from the binder formulation 5. Also during tests R-25 and R-26, several pellets were removed from the drum when the temperature reached 1000° C., 1050° C. and 1100° C. to determine the pellet compressive strength obtained at each of these temperatures. At 1000° C. the pellet compressive strength was about 15 lbs; this increased to nearly 40 lbs. at 1050° C. and from 90–120 lbs at 1100° C. Holding the pellet at 1100° C. for an additional 30 minutes did not significantly improve the compressive strength.

Polymer bonded pellets containing only polyvinyl alcohol (Test R-5) performed poorly under high temperature reducing conditions in spite of their high compressive strengths and drop number. This test demonstrates the significance of colloidal silica in the binder formulation. It is apparent from these reduction tests that decreasing the colloidal silica level in the pellet results in lower pellet durability and an increase in the number of broken pellets. These results indicate that a colloidal silica addition approaching 10–15 lb/ton is needed to produce an accepted hot strength iron oxide pellet, i.e. one having a room temperature compressive strength over 150 lbs. and a reduction durablity index over 85%.

EXAMPLE 5

Several binder formulation consisting of polyvinyl alcohol and colloidal silica were evaluated as binders for iron ore pellets. In addition to the binder formulations described in the proceeding examples the following additional formulations were used:

Binder formulation 8 comprised 8% polyvinyl alcohol and 7% colloidal silica (commercially available as Ludox DP-123 from DuPont, Wilmington, Del.);

Binder formulation 9 comprised 8% polyvinyl alcohol and 7% colloidal silica (commercially available as Ludox DP-124 from DuPont, Wilmington, Del.);

Binder formulation 10 comprised 40% colloidal silica (commercially available as NYACOL 1440 from EKA Chemicals, Marietta, Ga.);

Binder formulation 11 comprised 100% fumed silica (commercially available as Aerosil 90 from Degussa Corp., Ridgefield, N.J.); and Binder formulation 12 comprised 100% fumed silica (commercially available as Aerosil 300 from Degussa Corp., Ridgefield, N.J.).

The specifications and sources of the colloidal silica and polyvinyl alcohol used in the binder formulations are summarized in TABLE 8 below.

TABLE 8

POLYVINYL ALCOHOL - COLLOIDAL SILICA BINDERS USED FOR BONDING IRON ORE PELLETS

| BINDER DESIGNATION | BINDER 1 | BINDER 5 | BINDER 8 | BINDER 9 | BINDER 10 | BINDER 11 | BINDER 12 | BINDER 6 |
|---|---|---|---|---|---|---|---|---|
| BINDER FORM "AS RECEIVED" | LIQUID | LIQUID | LIQUID | LIQUID | LIQUID | POWDER | POWDER | POWDER |
| POLYVINYL ALCOHOL CONTENT % | 1.5 | 8.0 | 8.0 | 8.0 | 0 | 0 | 0 | 100 |
| AMORPHOUS SILICA CONTENT % | 18 | 7 | 7 | 7 | 40 | 100 (FUMED SILICA) | 100 (FUMED SILICA) | 0 |
| AVERAGE SILICA PARTICLE SIZE, NANOMETERS | 7 | 22 | 22 | 22 | 14 | 20 | 7 | — |
| VISCOSITY 25° C. Cps | 13–16 | Medium | High | High | 13–16 | — | — | — |

The colloidal silica used in the binder formulations tested consisted of both an aqueous dispersion ranging from 7 to 40 wt. % silica and a fine powder containing 100% silica. The organic polymer used is a polyvinyl alcohol, preferably in powder form, containing 100% polyvinyl alcohol (Binder formulation 6 is the preferred polyvinyl alcohol used in the formulations). Binder formulations 1 thru 5 and 8 and 9 are colloidal silica dispersions which contain from 1.5 to 8.0 wt. % of polyvinyl alcohol.

Binder formulations 8 and 9 contained the same concentration of polyvinyl alcohol (8%) and colloidal silica (7%) as binder formulation 5 but were of higher molecular weight (higher viscosity). The pelletizing tests conducted with formulations 8 and 9 both alone and in combination with polyvinyl alcohol (binder formulation 6) showed little improvement over binder formulation 5.

Binder formulation 10 is an aqueous silica dispersion and formulations 11 and 12 are "fumed" colloidal silica powder.

The pelletizing test results are listed in TABLES 9A thru 9E (Tests 27 to 58) and gives the "room temperature" compressive strength and 25 foot drop number of iron ore pellets made with the various colloidal silicas listed in TABLE 8. The colloidal silicas were evaluated alone and in combination with polyvinyl alcohol at various concentration levels in the pellet. As seen from TABLES 9A thru 9E none of the colloidal silica binders, when used alone, even at levels up to 125 lb/ton pellet gave room temperature pellet compressive strengths over 50 lbs or drop numbers greater than 0 (see Tests 27–34, 46, 56 and 58).

TABLE 9

IRON ORE PELLET STRENGTHS OBTAINED WITH BINDER FORMULATIONS

| TEST NUMBER | 27 | 28 | 29 | 30 | 31 | 32 | 33 |
|---|---|---|---|---|---|---|---|
| BINDER ADDITION, lb/ton | | | | | | | |
| BINDER 1 | | | | | | | |
| BINDER 5 | | | | 62.5 | 62.5 | 93.75 | |
| BINDER 8 | 31.25 | 62.5 | | | | | 93.75 |
| BINDER 9 | | | 62.5 | | | | |
| BINDER 10 | | | | | | | |
| BINDER 11 | | | | | | | |
| BINDER 12 | | | | | | | |
| BINDER 6 | | | | | | | |
| TOTAL BINDER ADDITION, lb/ton | 31.25 | 62.50 | 62.50 | 62.50 | 62.50 | 93.75 | |
| POLYVINYL ALCOHOL, lb/ton | 2.5 | 5.0 | 5.0 | 5.0 | 5.0 | 7.5 | 7.5 |
| COLLOIDAL SILICA, lb/ton | 2.2 | 4.4 | 4.4 | 4.4 | 4.4 | 6.6 | 6.6 |
| PELLET PROPERTIES | | | | | | | |
| [1]CONCENTRATE TYPE | H | M | M | M | H | M | M |
| [2]CONCENTRATE MOISTURE, % | 7.4 | 0 | 0 | 0 | 0 | 0 | 0 |
| GREEN PELLET MOISTURE, % | 12.4 | 13.2 | 14.3 | 12.5 | 12.8 | 15.4 | 13.2 |
| [3]DRY PELLET COMP. STRENGTH, lb | <25 | <30 | <30 | <35 | <25 | 50 | 50 |
| [4]DRY PELLET DROP NO. (25') | 0 | 0 | 0 | 0 | 0 | 0 | 0 |

KEY:
[1]H: Hematite (Hoogoven's concentrate); M: Magnetite (Taconite concentrate).
[2]Moisture of concentrate prior to addition of binder.
[3]Tests 27–45: Green pellets dried at 200° F. for 2 hours; Tests 46–58: Green pellets dried at 150° F. for 1 hour; cured at 300° F. for 1 hour.
[4]Number of approximately 25 ft drops on concrete slab before breaking (i.e. 0 means broken on first drop).
< less than
[a] Polyvinyl alcohol added to concentrate in powdered form.
[b]Polyvinyl alcohol added in liquid form separately from the addition of the colloidal silica material.
[c]Hematite pellet showed severe cracking after drying.

TABLE 9B

IRON ORE PELLET STRENGTHS OBTAINED WITH BINDER FORMULATIONS

| TEST NUMBER | 34 | 35 | 36 | 37 | 38 | 39 | 40 |
|---|---|---|---|---|---|---|---|
| BINDER ADDITION, lb/ton | | | | | | | |
| BINDER 1 | | 20.0 | 20.0 | 15.7 | 20.0 | 25.0 | |
| BINDER 5 | | | | | | | 20.0 |
| BINDER 8 | 125.0 | | | | | | |
| BINDER 9 | | | | | | | |
| BINDER 10 | | | | | | | |
| BINDER 11 | | | | | | | |
| BINDER 12 | | | | | | | |
| BINDER 6 | | 20.0[a] | 20.0[a] | 15.7[b] | 20 | 25.0[b] | 20.0[a] |
| TOTAL BINDER ADDITION, lb/ton | 125.0 | 40.0 | 40.0 | 31.40 | 40.0 | 50.0 | 40.0 |
| POLYVINYL ALCOHOL, lb/ton | 10.0 | 20.3 | 20.3 | 15.9 | 20.3 | 25.4 | 21.6 |
| COLLOIDAL SILICA, lb/ton | 8.8 | 3.6 | 3.6 | 2.8 | 3.6 | 4.5 | 1.4 |
| PELLET PROPERTIES | | | | | | | |
| [1]CONCENTRATE TYPE | M | M | H | H | M | M | M |
| [2]CONCENTRATE MOISTURE, % | 0 | 0 | 7.4 | 7.4 | 0 | 10.0 | 10.0 |
| GREEN PELLET MOISTURE, % | 15.1 | — | 13.5 | 10.3 | 12.4 | 14.1 | 12.2 |
| [3]DRY PELLET COMP. STRENGTH, lb | 55 | 80 | 75 | 50 | 88 | 80 | 73 |
| [4]DRY PELLET DROP NO. (25') | 0 | 0/1 | 0/1 | 0 | 0/1 | 0/1 | 0/1 |

KEY:
[1]H: Hematite (Hoogoven's concentrate); M: Magnetite (Taconite concentrate).
[2]Moisture of concentrate prior to addition of binder.
[3]Tests 27–45: Green pellets dried at 200° F. for 2 hours; Tests 46–58: Green pellets dried at 150° F. for 1 hour; cured at 300° F. for 1 hour.
[4]Number of approximately 25 ft drops on concrate slab before breaking (i.e. 0 means broken on first drop).
< = less than
[a]Polyvinyl alcohol added to concentrate in powdered form.
[b]Polyvinyl alcohol added in liquid form separately from the addition of the colloidal silica material.
[c]Hematite pellet showed severe cracking after drying.

TABLE 9C

IRON ORE PELLET STRENGTHS OBTAINED WITH BINDER FORMULATIONS

| TEST NUMBER | 41 | 42 | 43 | 44 | 45 | 46 |
|---|---|---|---|---|---|---|
| BINDER ADDITION, lb/ton | | | | | | |
| BINDER 1 | 31.3 | 31.3 | 27.8 | 31.3 | 31.3 | |
| BINDER 5 | | | | | | |
| BINDER 8 | | | | | | |
| BINDER 9 | | | | | | 125 0 |
| BINDER 10 | | | | | | |
| BINDER 11 | | | | | | |
| BINDER 12 | | | | | | |
| BINDER 6 | 31.3 | 31.3 | 27.8 | 31.3 | 31.3 | |
| TOTAL BINDER ADDITION, lb/ton | 62.5 | 62.5 | 55.6 | 62.6 | 62.6 | 125.0 |
| POLYVINYL ALCOHOL, lb/ton | 31.8 | 31.8 | 28.2 | 31.8 | 31.8 | 10.0 |
| COLLOIDAL SILICA, lb/ton | 5.6 | 5.6 | 5.0 | 5.6 | 5.6 | 8.8 |
| PELLET PROPERTIES | | | | | | |
| [1]CONCENTRATE TYPE | M | H | M | H | M | M |
| [2]CONCENTRATE MOISTURE, % | 10 | 10 | 0 | 0 | 0 | 7.0 |
| GREEN PELLET MOISTURE, % | 12.8 | 15.6 | 10.0 | 12.1 | 11.1 | 17.8 |
| [3]DRY PELLET COMP. STRENGTH, lb | 70 | 82 | 125 | 144 | 153 | So |
| [3]DRY PELLET DROP NO. (25') | 1/2 | 1/2 | 1 | 4/5 | 5 | 0 |

KEY:
[1]H: Hematite (Hoogoven's concentrate); M: Magnetite (Taconite concentrate).
[2]Moisture of concentrate prior to addition of binder.
[3]Tests 27–45: Green pellets dried at 200° F. for 2 hours; Tests 46–58: Green pellets dried at 150° F. for 1 hour; cured at 300° F. for 1 hour.
[4]Number of approximately 25 ft drops on concrate slab before breaking (i.e. 0 means broken on first drop).
< = less than
[a]Polyvinyl alcohol added to concentrate in powdered form.
[b]Polyvinyl alcohol added in liquid form separately from the addition of the colloidal silica material.
[c]Hematite pellet showed severe cracking after drying.

TABLE 9D

IRON ORE PELLET STRENGTHS OBTAINED WITH BINDER FORMULATIONS

| TEST NUMBER | 47 | 48 | 49 | 50 | 51 | 52 |
|---|---|---|---|---|---|---|
| BINDER ADDITION, lb/ton | | | | | | |
| BINDER 1 | | | | | | |
| BINDER 5 | 80.0 | 156.2 | | 40.0 | 80.0 | 80.0 |
| BINDER 8 | | | | | | |
| BINDER 9 | | | | | | |
| BINDER 10 | | | 27.8 | | | |
| BINDER 11 | | | | | | |
| BINDER 12 | | | | | | |
| BINDER 6 | 25.4 | 19.3 | 27.8 | 28.6 | 10.3 | 20.0 |
| TOTAL BINDER ADDITION, lb/ton | 105.4 | 174.5 | 55.6 | 68.6 | 90.3 | 100.0 |
| PDLYVINYL ALCOHOL, lb/ton | 31.8 | 31.8 | 27.8 | 31.8 | 16.7 | 26.4 |
| COLLOIDAL SILICA, lb/ton | 5.6 | 10.9 | 11.1 | 2.8 | 5.6 | 5.6 |
| PELLET PROPERTIES | | | | | | |
| [1]CONCENTRATE TYPE | M | M | M | M | M | M |
| [2]CONCENTRATE MOISTURE, % | 0 | 0 | 0 | 0 | 0 | 0 |
| GREEN PELLET MOISTURE, % | 10.8 | 9.9 | 12.2 | 9.4 | 9.9 | 8.7 |
| [3]DRY PELLET CDMP. STRENGTH, lb | 282 | 245 | 170 | 312 | 112 | 205 |
| [4]DRY PELLET DROP NO. (25') | 13 | 6 | 1 | 17/18 | 1/2 | 4/5 |

KEY:
[1]H: Hematite (Hoogoven's concentrate); M: Magnetite (Taconite concentrate).
[2]Moisture of concentrate prior to addition of binder.
[3]Tests 27–45: Green pellets dried at 200° F. for 2 hours; Tests 46–58: Green pellets dried at 150° F. for 1 hour; cured at 300° F. for 1 hour.
[4]Number of approximately 25 ft drops on concrate slab before breaking (i.e. 0 means broken on first drop).
< = less than
[a]Polyvinyl alcohol added to concentrate in powdered form.
[b]Polyvinyl alcohol added in liquid form separately from the addition of the colloidal silica material.
[c]Hematite pellet showed severe cracking after drying.

TABLE 9E

IRON ORE PELLET STRENGTHS OBTAINED WITH BINDER FORMULATIONS

| TEST NUMBER | 47 | 48 | 49 | 50 | 51 | 52 |
|---|---|---|---|---|---|---|
| BINDER ADDITION, lb/ton | | | | | | |
| BINDER 1 | | | | | | |
| BINDER 5 | | 80.0 | | | | |
| BINDER 8 | | | | | 72.3 | |
| BINDER 9 | | | | | | |
| BINDER 10 | 14.0 | | | | | 31.25 |
| BINDER 11 | | | 10.7 | | | |
| BINDER 12 | | | | 31.25 | | |
| BINDER 6 | 28.0 | 25.4 | 32.1 | | 24.1 | |
| TOTAL BINDER ADDITION, lb/ton | 42.0 | 105.4 | 42.8 | 31.25 | 96.4 | 31.25 |
| POLYVINYL ALCOHOL, lb/ton | 28.0 | 31.8 | 32.1 | 0 | 29.9 | 0 |
| COLLOIDAL SILICA, lb/ton | 5.6 | 5.6 | 10.7 | 31.3 | 5.1 | 12.5 |
| PELLET PROPERTIES | | | | | | |
| ¹CONCENTRATE TYPE | M | H | M | M | M | M |
| ²CONCENTRATE MOISTURE, % | 0 | 0 | 0 | 9.0 | 0 | 10.0 |
| GREEN PELLET MOISTURE, % | 11.4 | 12.3 | 11.3 | 16.2 | 12.9 | 13.7 |
| ³DRY PELLET COMP. STRENGTH, lb | 180 | 160 | 183 | <10 | 210 | <10 |
| ⁴DRY PELLET DROP NO. (25') | 3 | 4/5 | 3/4 | 0 | 4/5 | 0 |

KEY:
¹H: Hematite (Hoogoven's concentrate); M: Magnetite (Taconite concentrate).
²Moisture of concentrate prior to addition of binder.
³Tests 27–45: Green pellets dried at 200° F. for 2 hours; Tests 46–58: Green pellets dried at 150° F. for 1 hour; cured at 300° F. for 1 hour.
⁴Number of approximately 25 ft drops on concrate slab before breaking (i.e. 0 means broken on first drop).
< = less than
ᵃPolyvinyl alcohol added to concentrate in powdered form.
ᵇPolyvinyl alcohol added in liquid form separately from the addition of the colloidal silica material.
ᶜHematite pellet showed severe cracking after drying.

In order to achieve good room temperature pellet strength, sufficient polyvinyl alcohol must be added to the colloidal silica. As described in the previous examples, the standard practice was to dissolve the polyvinyl alcohol with the colloidal silica aqueous dispersion prior to mixing with the concentrate.

The addition of polyvinyl alcohol powder directly to the we (10%) filter cake concentrate is the preferable approach, however, when the polyvinyl alcohol is applied in this manner it does not produce an effective bond pellet. A comparison of magnetite and hematite pellet strengths obtained with both liquid and powdered polyvinyl alcohol at equivalent polyvinyl alcohol and colloidal silica levels in the pellet is given in TABLE 10. As noted, the pellet compressive strength and drop number were much lower when the powdered polyvinyl alcohol was added directly to the wet filter cake concentrate.

TABLE 10

MAGNETITE & HEMATITE PELLET STRENGTHS WITH MIXTURE OF BINDER FORMULATIONS 1 & 6

| TEST NUMBER | 41 | 45 | 42 | 44 |
|---|---|---|---|---|
| CONCENTRATE TYPE | MAGNETITE | MAGNETITE | HEMATITE | HEMATITE |
| BINDER ADDITION, 1b/ton¹ | | | | |
| BINDER 1 | 31.3 | 31.3 | 31.3 | 31.3 |
| ²BINDER 6 | 31.3 | | 31.3 | |
| ³BINDER 6 | | 31.3 | | 31.3 |
| POLYVINYL ALCOHOL CONTENT lb/ton | 31.8 | 31.8 | 31.8 | 31.8 |
| COLLOIDAL SILICA CONTENT lb/ton | 5.6 | 5.6 | 5.6 | 5.6 |
| PELLET COMPRESSIVE STPENGTH lbs | 70 | 153 | 82 | 144 |
| PELLET DROP NUMBER | 1/2 | 5 | 1/2 | 4/5 |

KEY:
¹Short ton = 2000 lbs;
²Polyvinyl alcohol, binder 6, added as a powder to 10% filter cake concentrate separate from binder 1;
³Polyvinyl alcohol, binder 6, dissolved in binder 1 prior to adding to dry concentrate.

Figure 3:
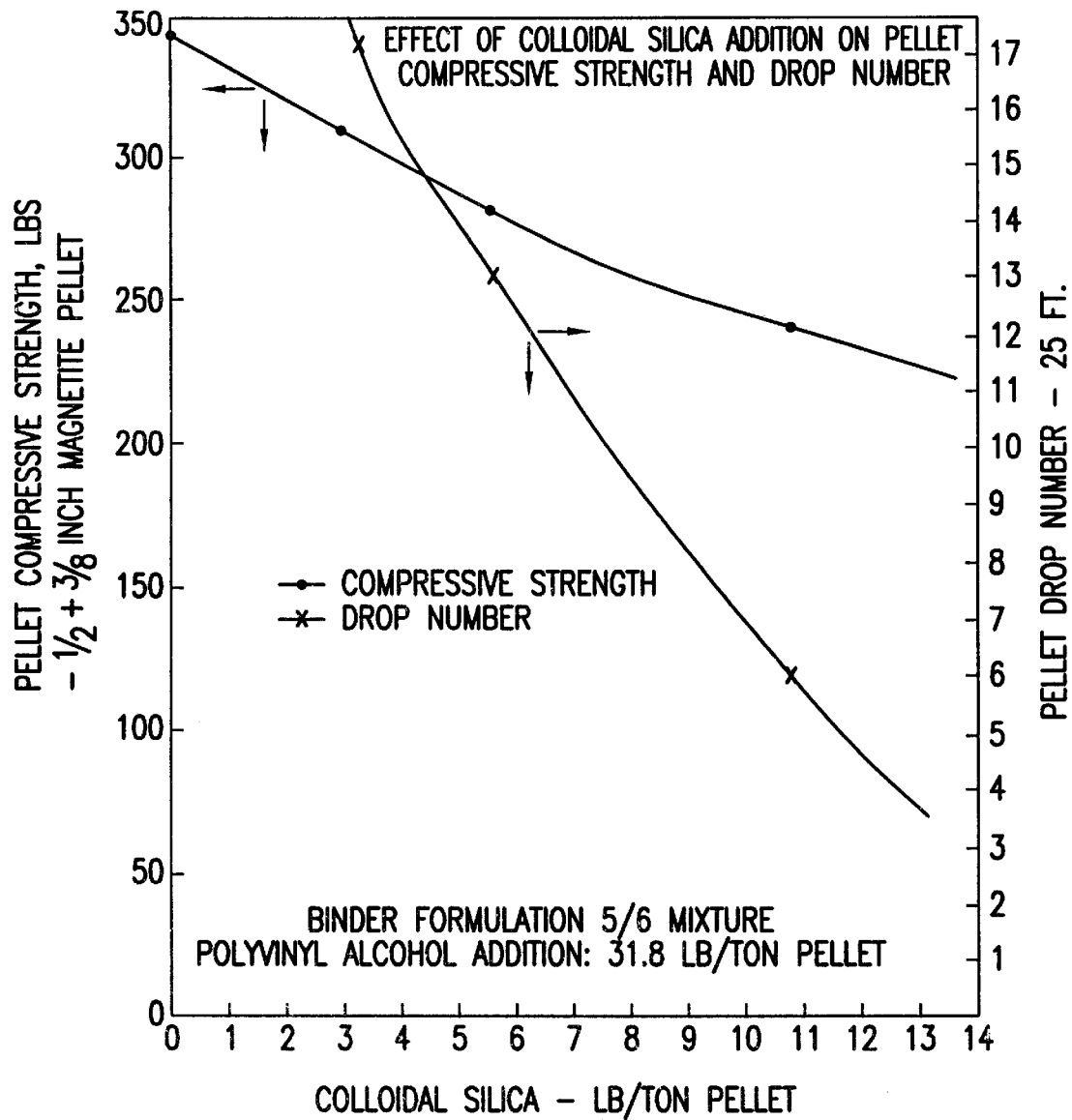
FIG. 3 is a graphic illustration of the effect of colloidal silica addition on pellet compressive strength and drop number.

Pellets made from a hematite concentrate were evaluated using two different binder formulations: (1) a mixture of binder formulations 1 and 6; and (2) a mixture of binder formulations 5 and 6. These were compared with the standard magnetite pellets at equivalent polyvinyl alcohol and colloidal silica levels (see TABLES 11 and 12). For both pellet types, higher compressive strengths and drop numbers were obtained with mixture (2) the combination of binder formulations 5 & 6. Hematite pellets produced with both binder formulations had somewhat lower strengths than the magnetite pellets. A reason for the lower strengths could be due to the higher specific surface of the hematite concentrate.

strength and drop number will be considerably higher as shown in FIG. 3.

The graph in FIG. 3 illustrates the effect of colloidal silica additions on the "room temperature" compressive strength and drop number at a constant polyvinyl alcohol addition of 31.8 lb/ton. The pellet compressive strength and drop number of magnetite pellets containing 2.8 lb/ton colloidal silica

TABLE 11

EFFECT OF VARIOUS BINDER FORMULATIONS ON MAGNETIC PELLET STRENGTH AT EQUIVALENT PVOH/COLLOIDAL SILICA CONCENTRATIONS

| BINDER FORMULATION | BINDER 1/BINDER 6 | BINDER 5/BINDER 6 | BINDER 10/BINDER 6 |
|---|---|---|---|
| TEST NUMBER | 45 | 47 | 53 |
| BINDER ADDITION, lb/ton[1] | | | |
| BINDER 1 | | | |
| BINDER 5 | 31.3 | 80.0 | |
| BINDER 10 | | | 14.0 |
| BINDER 6 | 31.3 | 25.4 | 28.0 |
| POLYVINYL ALCOHOL CONTENT lb/ton | 31.8 | 31.8 | 28.0 |
| COLLOIDAL SILICA CONTENT lb/ton | 5.6 | 5.6 | 5.6 |
| PELLET COMPRESSIVE STRENGTH lbs | 153 | 282 | 180 |
| PELLET DROP NUMBER | 5 | 13 | 3 |

KEY:
[1]Short ton = 2000 lbs.

TABLE 12

COMPARISON OF MAGNETITE & HEMATITE PELLET STRENGTH AT EQUIVALENT PVOH/COLLOIDAL SILICA CONCENTRATIONS

| BINDER FORMULATION | BINDER 1/ BINDER 6 | BINDER 1/ BINDER 6 | BINDER 5/ BINDER 6 | BINDER 5/ BINDER 6 |
|---|---|---|---|---|
| TEST NUMBER | 44 | 45 | 47 | 54 |
| CONCENTRATE TYPE | HEMATITE | MAGNETITE | MAGNETITE | HEMATITE |
| BINDER ADDITION, lb/ton[1] | | | | |
| BINDER 1 | 31.3 | 31.3 | | |
| BINDER 5 | | | 80.0 | 80.0 |
| BINDER 6 | 31.3 | 31.3 | 25.4 | 25.4 |
| POLYVINYL ALCOHOL CONTENT lb/ton | 31.8 | 31.8 | 31.8 | 31.8 |
| COLLOIDAL SILICA CONTENT lb/ton | 5.6 | 5.6 | 5.6 | 5.6 |
| PELLET COMPRESSIVE STRENGTH lbs | 144 | 153 | 282 | 160 |
| PELLET DROP NUMBER | 4/5 | 5 | 13 | 4/5 |

KEY: Magnetite: Taconite concentrate; Hematite: Hoogoven Concentrate

Figure 2:
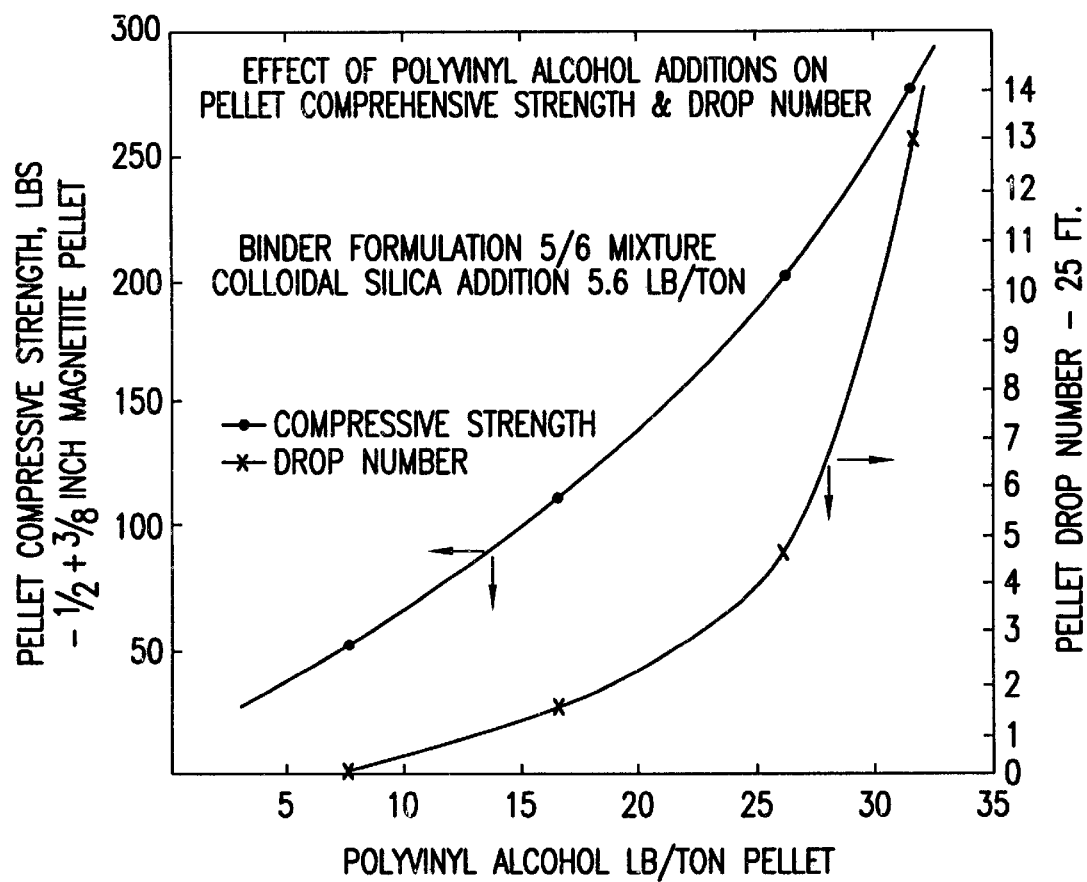
FIG. 2 is a graphic illustration of the effect of polyvinyl alcohol additions on pellet compressive strength and drop number.

The examples and tests described above were conducted to determine the "minimum" amount of polyvinyl alcohol polymer required to produce a "room temperature" pellet with a compressive strength of at least 200 lbs. FIG. 2 is a graph showing the effect of polyvinyl alcohol additions on pellet compressive strength and drop number. For these tests the colloidal silica level in the pellet was maintained at 5.6 lb/ton. FIG. 2 also shows that to produce a 200 lb/ton pellet with a drop number of at least 4 will require about 25 lb/ton of polyvinyl alcohol when using the binder formulation that is a mixture of formulations 5 & 6. If less than 5.6 lb/ton colloidal silica is required for acceptable high temperature reduction durability, the room temperature compressive were 312 lb and 17 drops compared to 245 lb and 6 drops for magnetite pellets containing 10.9 lb/ton colloidal silica. Since large amounts of colloidal silica have a negative impact on the "room temperature" pellet strength, the amount added to the pellet should be kept at a minimum or only what is necessary to prevent pellet degradation during the high temperature (1000° C.) reduction process.

Finally, it is understood that variations and modifications from the examples given herein are possible in view of the foregoing disclosure. Therefore, although the invention has been described with reference to certain preferred embodiments it will be appreciated that other binder formulations, mineral pellets and processes for producing them may be devised, which are nevertheless within the scope and spirit of the invention as defined in the claims appended hereto.

What is claimed is:

1. A mineral pellet comprised of:
   a mineral concentrate or mineral fines; and
   a binder formulation comprised of colloidal silica and a polymeric binder comprised of a water-soluble polyvinyl alcohol;
   wherein said mineral concentrate or mineral fines are at least 96 dry wt. % of the mineral pellet; said colloidal silica is present in an amount up to 2 dry wt. % of the mineral pellet; and said polymeric binder is present in an amount up to 2 dry wt. % of the mineral pellet such that under low temperature drying the mineral pellet has strength sufficient for transporting the pellet and high temperature strength sufficient for use in iron-making processes.

2. The mineral pellet according to claim 1, wherein said colloidal silica is provided in the form of a water dispersion of silica.

3. The mineral pellet according to claim 1, wherein said colloidal silica is provided in the form of montmorillonite.

4. The mineral pellet according to claim 1, wherein said colloidal silica is provided in the form of bentonite.

5. The mineral pellet according to claim 1, wherein said mineral concentrate or fines are selected from the group consisting of magnetite, hematite, mixtures of magnetite and hematite, and other mineral concentrates or fines that cannot be exposed to high temperature heat treatments.

* * * * *

UNITED STATES PATENT AND TRADEMARK OFFICE
CERTIFICATE OF CORRECTION

PATENT NO. : 6,384,126 B1
DATED : May 7, 2002
INVENTOR(S) : Pirtle et al.

It is certified that error appears in the above-identified patent and that said Letters Patent is hereby corrected as shown below:

Column 12,
Table 2, line 55, in the Content % Average Silica row, after "22", delete "13" and insert -- ---- --.

Column 19,
Table 7A, line 19, in the Test No. row, "R-3", delete "R-6" and insert -- R-5 --.

Column 20,
Table 7A, line 9, in the Test No. row, after "R-3", delete "R-6" and insert -- R-5 --.

Column 24,
Table 9, line 35, in the Total Binder Addition, lb/ton row, after "93.75" insert -- 93.75 --.
Line 63, after "<" insert -- = --.

Column 25,
Line 37, delete "concrate" and insert -- concrete --.

Column 26,
Table 9C, line 10, in the $^3$Dry Pellet Comp. Strength, lb row, after "125", delete "144" and insert -- 144$^c$ --.
Lines 21 and 61, delete "concrate" and insert -- concrete --.

Column 27,
Table 9E, line 7, in the Test Number row, delete "47 48 49 50 51 52" and insert -- 53 54 55 56 57 58 --.

Column 28,
Table 9E, line 6, in the Test Number row, delete "47 48 49 50 51 52" and insert -- 53 54 55 56 57 58 --.
Line 15, delete "concrate" and insert -- concrete --.

UNITED STATES PATENT AND TRADEMARK OFFICE
CERTIFICATE OF CORRECTION

PATENT NO.    : 6,384,126 B1
DATED         : May 7, 2002
INVENTOR(S)   : Pirtle et al.

It is certified that error appears in the above-identified patent and that said Letters Patent is hereby corrected as shown below:

Column 29,
Table 11, line 25, in the Colloidal Silica Content 1b/ton row, after "5.6", delete "S.6" and insert -- 5.6 --.

Signed and Sealed this

Twenty-second Day of October, 2002

Attest:

Attesting Officer

JAMES E. ROGAN
Director of the United States Patent and Trademark Office